15# United States Patent [19]

Hausin

[11] Patent Number: 6,022,476
[45] Date of Patent: Feb. 8, 2000

[54] WATER TREATMENT PROCESS

[75] Inventor: Volker A. Hausin, Rochester, N.Y.

[73] Assignee: TVT US Corp., West Henrietta, N.Y.

[21] Appl. No.: 09/016,722

[22] Filed: Jan. 31, 1998

[51] Int. Cl.[7] .................................. C02F 3/10; C02F 7/00
[52] U.S. Cl. .......................... 210/610; 210/615; 210/747;
210/150; 210/170
[58] Field of Search ..................................... 210/615–617,
210/610, 611, 621, 747, 96.1, 87, 103,
150, 151, 170, 175, 184, 194, 242.2, 614,
743; 261/91

[56] References Cited

U.S. PATENT DOCUMENTS

| 3,235,234 | 2/1966 | Beaudoin | 210/242.2 |
| 4,882,099 | 11/1989 | Durda et al. | 210/242.2 |
| 4,925,564 | 5/1990 | Francis | 210/615 |
| 5,228,998 | 7/1993 | DiClemente et al. | 210/242.2 |
| 5,421,999 | 6/1995 | Poole et al. | 210/242.2 |
| 5,507,950 | 4/1996 | Senda et al. | 210/242.2 |
| 5,554,291 | 9/1996 | Scanzillo et al. | 210/242.2 |
| 5,707,562 | 1/1998 | Karliner | 261/91 |

Primary Examiner—Thomas G. Wyse
Attorney, Agent, or Firm—Howard J. Greenwald

[57] ABSTRACT

A method for removing selected biodegradable materials from a body of water. In the first step of this method, a plurality of bio-suspension elements are disposed within an enclosure which is floating at least partially submerged in a body of water; the bio-suspension elements provide surfaces for supporting the growth of at least five different biological microorganisms. The different biological microorganisms are intermittently introduced into the enclosure along with water; the water is continuously aerated and fed into the enclosure at a rate of at least about 60 feet per minute. The treated water so produced is continuously removing from the enclosure at a rate of at least about 60 feet per minute. The pH, the total dissolved solids, the temperature, and the flow rate of the treated water is continuously measured.

9 Claims, 9 Drawing Sheets

WATER TREATMENT PROCESS

FIELD OF THE INVENTION

A process for removing biodegradable materials from water in which the water is contacted with biological microorganisms disposed on a plurality of bio-suspension elements.

BACKGROUND OF THE INVENTION

U.S. Pat. No. 5,228,998 of Lee M. DiClemente et al. discloses a method which uses biological microorganisms for removing selected biodegradable materials from a pond or a similar body of water. The entire disclosure of each of this United States patent is hereby incorporated by reference into this specification.

The DiClemente process involves the steps of: (a) analyzing a sample of said pond water to determine at least one type of microorganism appropriate for feeding on the selected materials, (b) fixing a plurality of bio-suspension elements within an enclosure which is floating at least partially submerged in the water body, wherein such elements provide surfaces for supporting the growth of films of biological microorganisms, (c) introducing the appropriate microorganisms into the enclosure along with discrete amounts of such pond water in order to grow colonies of the microorganisms on the bio-suspension elements while minimizing circulation or other motion of the pond water within the enclosure, (d) sampling, testing, and analyzing the water and the microorganisms in the enclosure and nurturing the growth of such microorganisms until large and stable colonies of such microorganisms have been established on the bio-suspension elements, and, thereafter, (e) circulating pond water gently and regularly through and around the stable colony of microorganisms in the enclosure and returning the circulated water to the pond.

The DiClemente patent teaches that, in its claimed process, ". . . heavy turbulence of the input stream is intentionally avoided . . . " (see column 2, lines 64–65) and that ". . . our invention achieves the biological activity that it uses to reduce pollutants by specifically avoiding uncontrolled turbulence in water being treated . . . " (see column 2, lines 31–34).

However, the apparatus of the DiClemente patent has poor reliability. Because of the process in which it is used, the bio-suspension elements in the bio-chamber of the device often tend to become plugged with uncontrolled microorganism growth; when this occurs, water will cease flowing into and out of the device. Because this device is submerged at least partially in a body of water, it is difficult to repair it.

Even when the apparatus of the DiClemente patent is not plugged with uncontrolled microorganism growth, it does a relatively poor job of purifiing the body of water in which it is at least partially submgerged.

It is an object of this invention to provide a process and apparatus for treating water which are substantially more reliable and effective and the process and apparatus of the U.S. Pat. No. 5,228,998.

SUMMARY OF THE INVENTION

In accordance with this invention, there is provided a process for treating a body water to purify it. In the first step of this process, a portion of the water to be treated is continuously caused to flow at a rate of at least about 60 feet per minute and is continuously fed into a biochamber within which are disposed at least five distinct strains of microorganisms.

BRIEF DESCRIPTION OF THE DRAWINGS

The invention will be described by reference to the specification and to the enclosed drawings, in which like elements are described by like numerals, and wherein.

DESCRIPTION OF THE PREFERRED EMBODIMENTS

Figure 1:
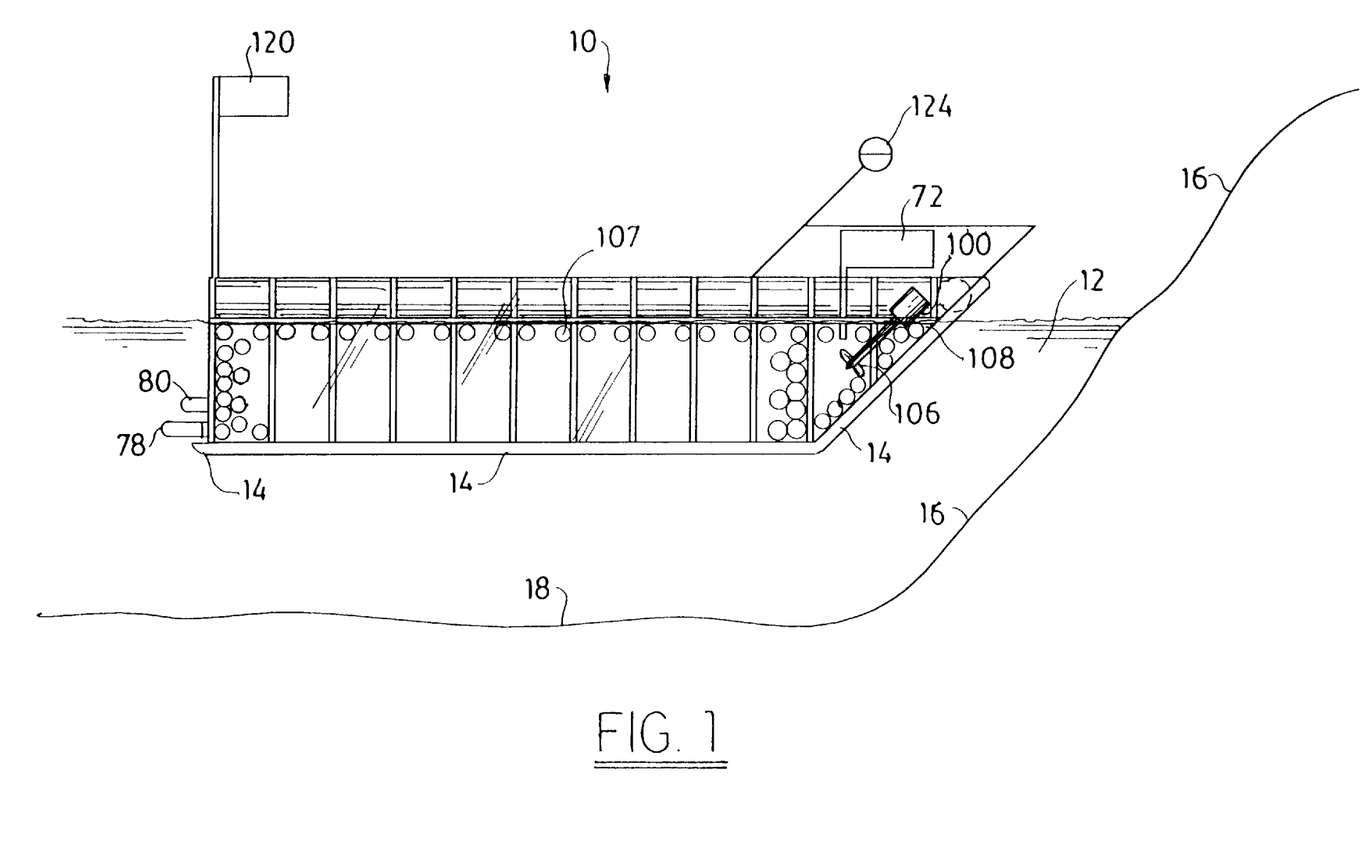
FIG. 1 is a side view of one preferred apparatus of the invention.

FIG. 1 is a side view of one preferred embodiment of the apparatus of this invention. Referring to FIG. 1, it will be seen that biobreeder 10 is shown partially submerged within a body of water 12. The embodiment depicted in FIG. 1 is suitable for reducing the level of contaminants in various bodies of water such as, e.g., lagoons, lakes, ponds, streams, rivers, and the like.

In one embodiment, the body of water to be treated is a treatment lagoon. As used in this specification, the term treatment lagoon refers to a man-made body of water which is used for the intermediate storage and treatment of effluent. Thus, by way of illustration and not limitation, one may treat one or more of the lagoons disclosed in U.S. Pat. Nos. 5,5624,563 (activated sludge treatment lagoon), U.S. Pat. No. 5,593,575 (wastewater treatment lagoon), U.S. Pat. Nos. 5,542,981, 5,076,929 (sewage lagoon system), U.S. Pat. No. 3,897,734 (aerated sewage lagoon), U.S. Pat. No. 3,893,924 (aerobic lagoon), U.S. Pat. Nos. 3,672,647, 3,5121,380, 3,485,750, and the like. The entire disclosure of each of these United States patents is hereby incorporated by reference into this specification.

It is preferred that the body of water to be treated be at least about 8 feet deep and, more preferably, be at least about 12 feet deep.

Referring again to FIGS. 1 and 2, and in the preferred embodiments depicted therein, it will be seen that biofeeder 10 is comprised of installation runners 14 which assist in the placement of the biofeeder 10 within the body of water 12. Referring to FIG. 1, the runners 14 will evenly distribute the weight of biobreeder 10 on the bank 16 of the body of water 12 and readily allow the biobreeder to enter and/or exit such body of water 12.

As will be apparent to those skilled in the art, bank 16 and/or base 18 of body of water 12 is often covered with a water-impervious material, such as high density polyethylene. The high density polyethylene liners, which are often also known as landfill liners, are well known to those skilled in the art and are described, e.g., in U.S. Pat. Nos. 5,607,234, 5,597,194, 5,511,619 (abrasion resistant liner), U.S. Pat. No. 5,258,217 (landfill liner), U.S. Pat. No. 5,076,728, and the like. The entire disclosure of each of these United States patents is hereby incorporated by reference into this specification.

In one embodiment, not shown, installation tracks (not shown in FIG. 1) are first placed upon the bank 16 of the body of water 12 to more readily facilitate the sliding of the runners 14 on them. As will be apparent to those skilled in the art, the use of these installation tracks also protects the polyethylene liner (not shown) which is present in the body of water. FIG. 3 illustrates this embodiment. Referring to FIG. 3, it will be seen that tracks 20 are partially disposed on shore 22, are partially disposed on bank 16, and are partially submerged within the body of water 12. The preferred embodiment of tracks 20 depicted in FIG. 3 comprise upstanding ridges 23 and 24 which are adapted to engage runners 14 as the biobreeder 10 enters or exits the water 12. For the sake of simplicity of representation, the polyethylene liner (not shown) has been omitted from FIGS. 1, 2, and 3.

Referring again to FIG. 3, and in the preferred embodiment depicted therein, tracks 20 are each comprised of sections 26, 28, 30, and 32 which are preferably removably attached to each other.

In one embodiment, each of the tracks 20 is preferably comprised of a resiliently flexible material such as, e.g., high density polyethylene, polypopylene, and the like.

The runners 14 are preferably made from a synthetic polymeric material. In one embodiment, they consist essentially of high density polyethylene. In another embodiment, they consist essentially of fiberglass-reinforced plastic material.

Figure 4:
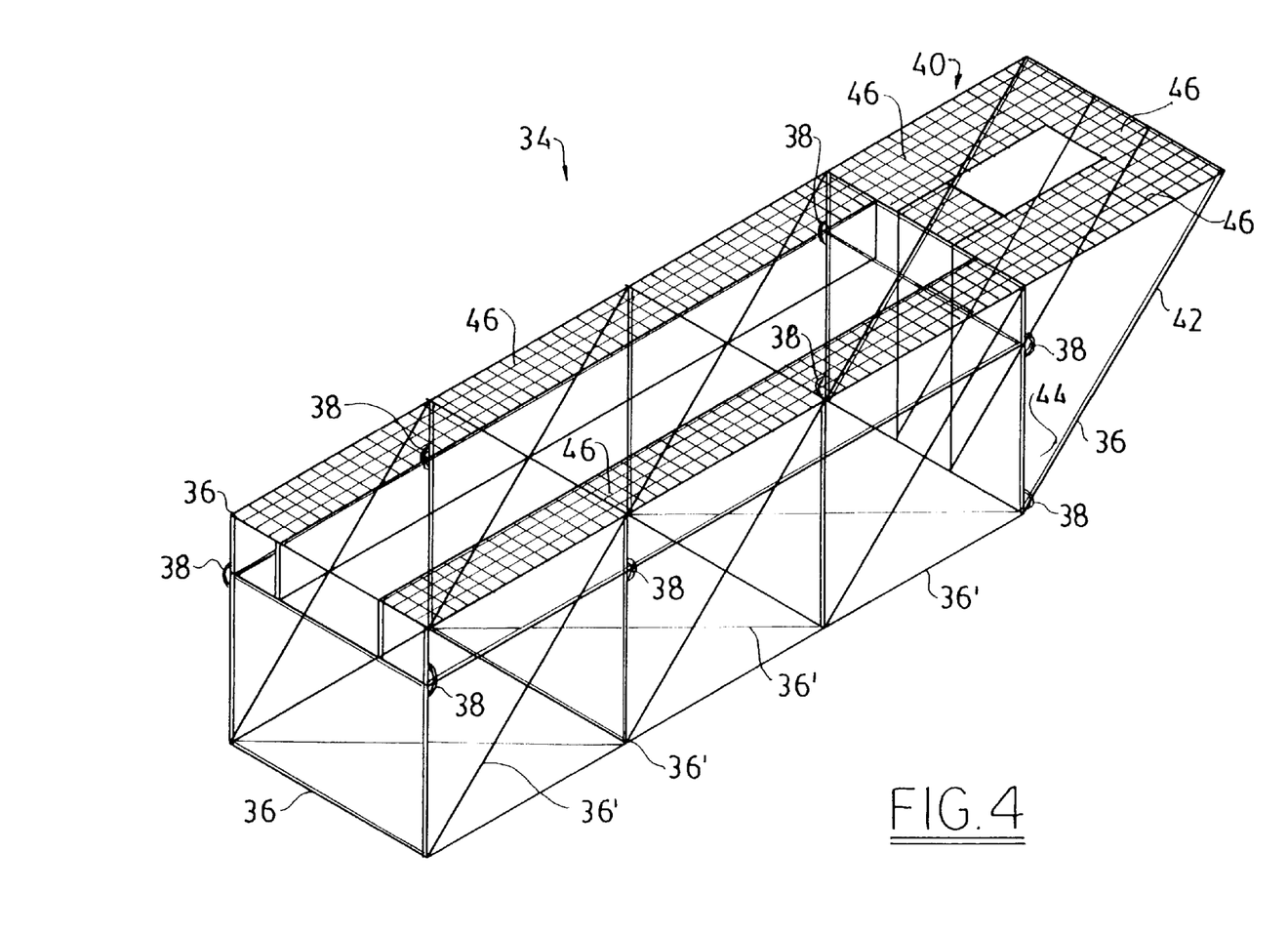
FIG. 4 is a perspective view of the frame of the biobreeder apparatus of this invention from which certain detail has been omitted for the sake of simplicity of representation.

FIG. 4 is a perspective view of the frame 34 of the biobreeder apparatus 10 from which unnecesssary detail has been omitted for the sake of simplicity of representation. Referring to FIG. 4, it will be seen that frame 34 is comprised of a multiplicity of beams 36 which are joined to each other by conventional fasteners (not shown) such as, e.g., fiberglass bolts, fiberglass nuts, and fiberglass plates. As will be apparent to those skilled in the art, the frame also is comprised of a multiplicity of lifting lugs 38 which can be used during the installation and/or the removal of the biobreeder 10 from the body of water 12.

Referring again to FIG. 4, it will be seen that the front portion 40 of frame 34 is comprised of a ramped section 42 which forms an acute angle 44 with the the base beams 36'. Acute angle 44 is preferably from about 30 to about 60 degrees and, most preferably, is about 45 degrees. As will be apparent to those skilled in the art, the presence of ramped section 42 facilitates the entry and exit of the biobreeder unit 10, especially when runners 14 (not shown) are used in conjunction with tracks 20 (not shown).

It is preferred that each of beams 36 consist essentially of fiberglass reinforced plastic. One may use any of the fiberglass reinforced plastic materials known to those skilled in the art, such as, e.g., those disclosed in U.S. Pat. Nos. 5,562,981, 5,505,497, 5,449,320, 5,446,250, 5,424,017, 5,398,975, 5,362,115, 5,350,202, 4,995,213, 4,619,954, 4,375,527, 4,305,518, 4,155,207, 4,068,777, and the like. The entire disclosure of each of these United States patents is hereby incorporated by reference into this specification.

In one preferred embodiment, the fiberglass reinforced plastic system is purchased from T. J. Cope, INc. of 9 Iron Bridge Drive, Collegeville, Pa. as the "Aickinstrut Fiberglass Strut Support System and Fasteners." Reference may be had, e.g., to the Aickinstrut catalog AIC100, 5M which was published in July of 1997. As will be apparent to those skilled in the art, the plastic material may be polyvinyl chloride, polyester (pultruded), vinyl ester (pultruded), polyurethane, polypropylene, nylon, and the like.

Referring again to FIG. 4, it will be seen that the top of frame 34 is selectively covered with a grating 46 which, preferably, consists essentially of fiberglass. Thus, e.g., one may may fiberglass grating 46 by any of the means well known to those skilled in the art. Thus, e.g., one may use one or more of the fiberglass gratings disclosed in U.S. Pat. No. 5,232,462 (fiberglass grating from pultruded fiberglass grating bars), U.S. Pat. Nos. 5,074,590, 4,760,680 (fiberglass grating formed from interlocked pultruded fiberglass grating bars), U.S. Pat. No. 3,772,126, and the like. The entire disclosure of each of these United States patents is hereby incorporated by reference into this specification.

Figure 5:
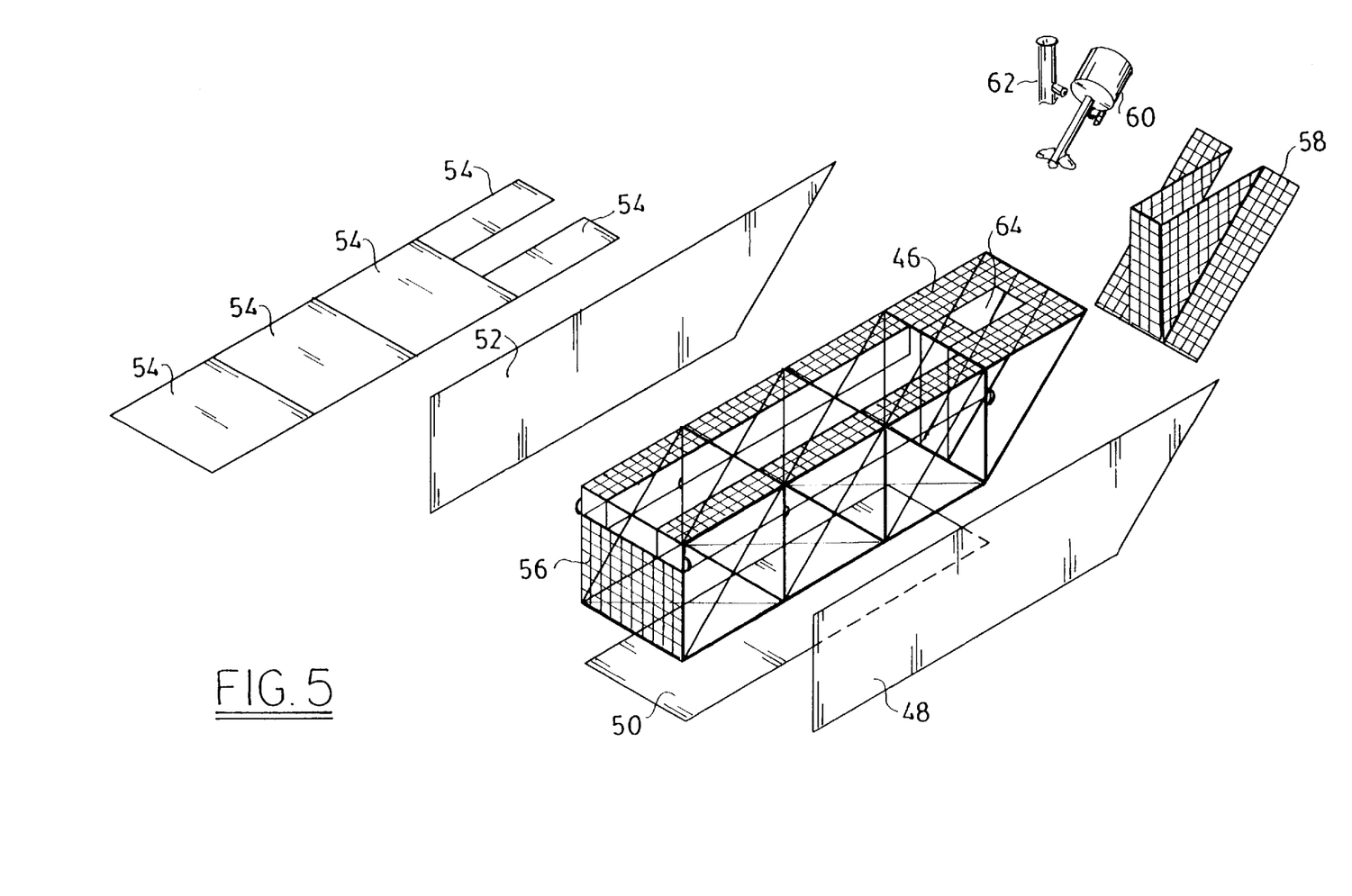
FIG. 5 is an exploded view of the frame of the biobreeder apparatus of this invention showing some of the cladding attached to such frame.

It is preferred that the sides, top, and bottom of frame 34 be clad with suitable retaining means so that the material disposed within such frame 34 cannot escape into the body of water 12. FIG. 5 is an exploded view of one preferred embodiment of frame 34 showing some suitable cladding. Referring to FIG. 5, it will be seen that sheet 48 of plastic material is attached to the right side of frame structure 34 by conventional means such as, e.g., plastic fasteners. In the embodiment depicted, sheet 48 is depicted as being an integral structure. In another embodiment, not shown, sheet 48 may be comprised of several distinct sheets of plastic material which are joined together by conventional means.

Sheet 48, and the other cladding sheets 50 and 52, preferably consist of the same plastic material. In one embodiment, each of sheets 48, 50, and 52 consist essentially high density polyethylene. In another embodiment, top sheet 54 consists of high density polyethylene. In yet another embodiment, top sheet 54 consists of transparent plastic material such as, e.g., LEXAN (a polycarbonate material sold by the General Electric Corporation), transparent polyvinyl chloride, and the like.

Referring again to FIG. 5, it will be seen that an end grate 56 is mounted to the rear of frame 34 by conventional means, and that an entrance grate 58 is attached to the front of the frame 34. It is preferred that end grate 56, entrance grate 58, and grating 46 all consist essentially of fiberglass reinforced plastic.

Referring again to FIG. 5, it will be seen that a mixer 60 which communicates with assembly 62 is disposed in orifice 64

Figure 6:
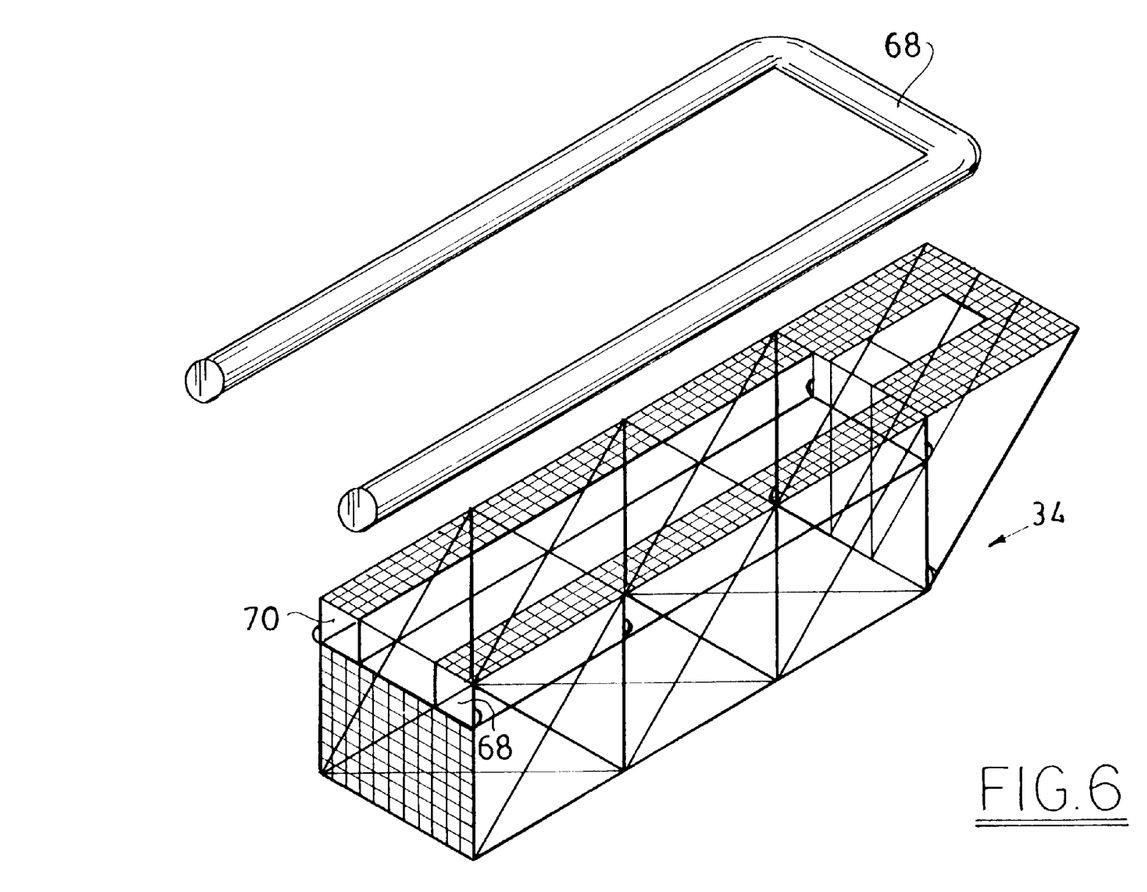
FIG. 6 is an exploded view of the frame of the biobreeder apparatus and the pontoon assembly showing their relationship.

FIG. 6 is an exploded view illustrating how the device 10 is maintained in a partially submerged condition. Referring to FIG. 6, it will be seen that flotation assembly 66 may be disposed within slots 68 and 70.

One may use any conventional pontoon assembly to provide flotation; see, e.g., pontoons 14 depicted in U.S. Pat. No. 5,228,998. It is preferred, however, to construct flotation assembly 66 from CSR PolyPipe. This piping material is sold by the CSR PolyPipe Company of Gainesville, Tex. As is known to those skilled in the art, when such piping material is capped, it is buoyant.

Figure 2:
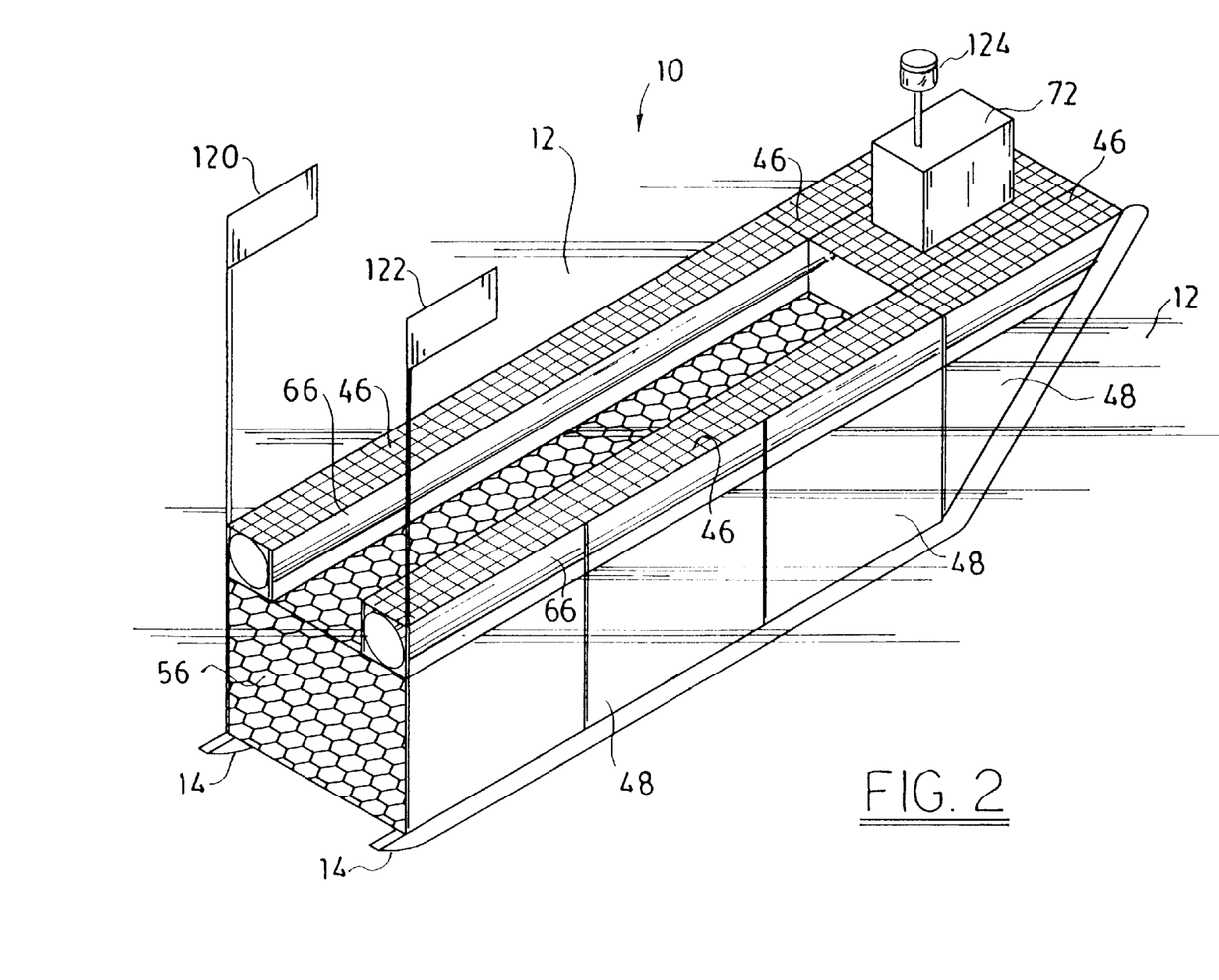
FIG. 2 is a perspective view of another preferred apparatus of the invention.
Figure 3:
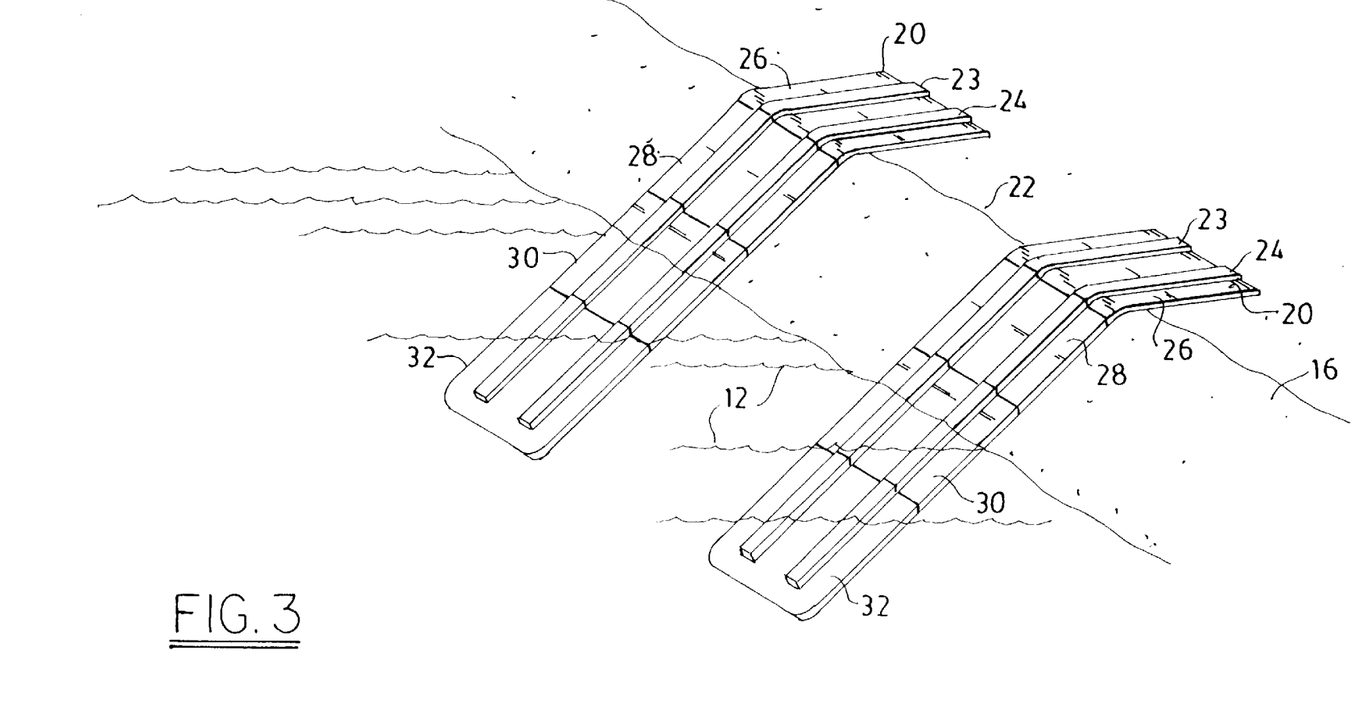
FIG. 3 is a partial schematic view of a bank of a body of water onto which set of tracks has been placed to receive a biobreeder device.
Figure 7:
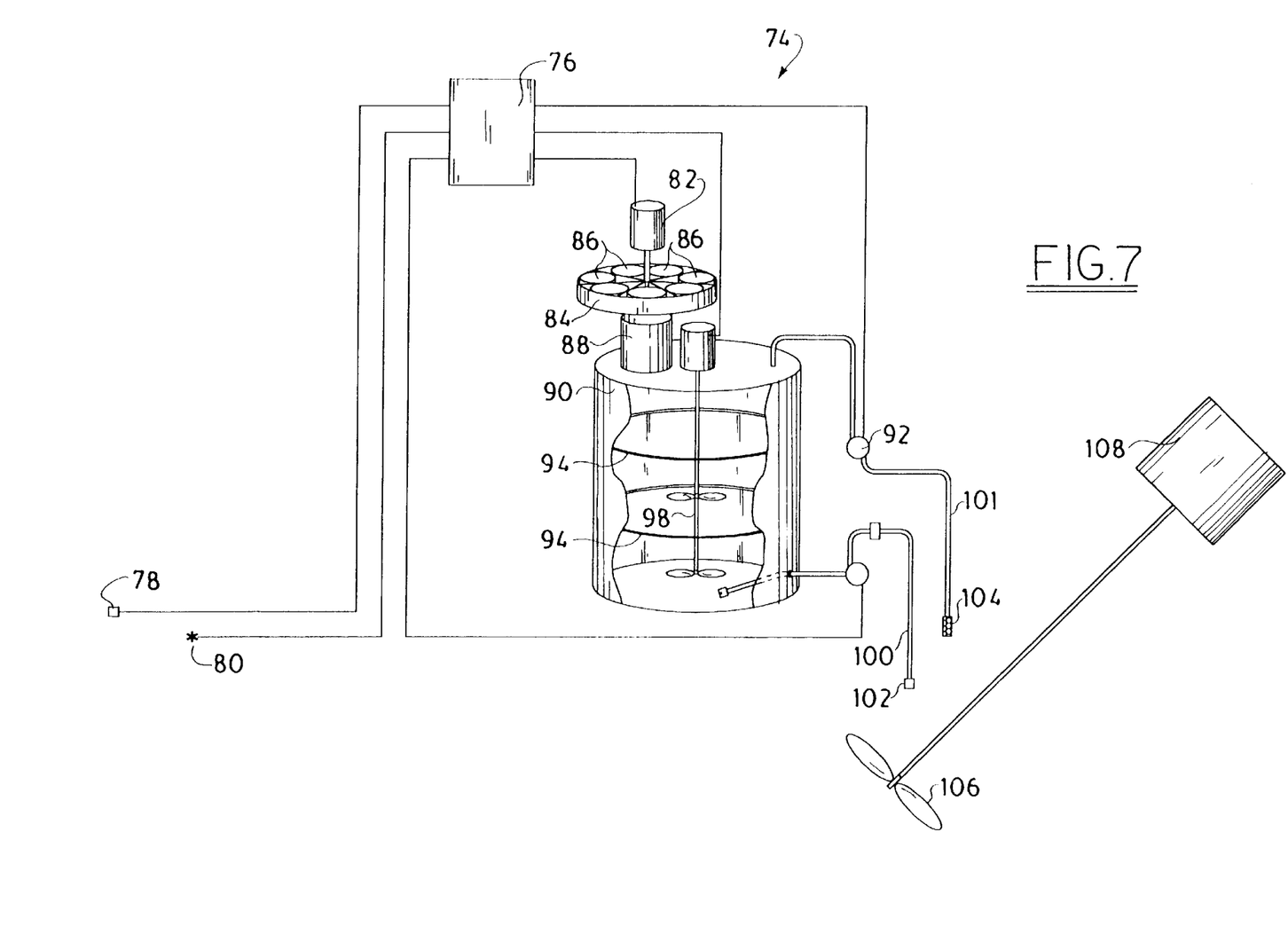
FIG. 7 is a schematic of a preferred control apparatus for the device of this invention.

Referring to FIGS. 1 and 2, a controller housing is disposed on the top surface of the device 10 and contains a controller assembly 74, which is depicted schematically in FIG. 7.

Referring to FIG. 7, it will be seen that controller assembly 74 is comprised of a controller 76 which is connected to a probe 78. The probe 78 is disposed at or near the end of the assembly 10 (see FIG. 1), and it monitors the pH of the liquid, the total dissolved solids present in the liquid, and the temperature of the liquid.

Referring again to FIG. 7, a probe 80 is also connected to the controller 76 and is preferably disposed near probe 78. Probe 80 preferably monitors flow rate.

One may use conventional probes for probes 78 and 80. Thus, e.g., referring to the Signet Scientific Company catalog 3-000.701 (printed January of 1997), one may use a 3-2536-P0 paddle wheel flow sensor as probe 80.

Referring again to FIG. 7, controller 76 is also connected to a motor 82 which rotates sequencer 84. Sequencer 84 contains chambers 86 which are rotated and which, when they are disposed over column 88, dispense a powdered biological material into such column 88 and thence into tank 90.

Controller 76 is also connected to pump 92, which controls the rate of flow of water into tank 90. Furthermore, controller 76 also controls the actions of heat tapes 94, and thus can raise the temperature of the tank to desired levels. Generally, it is desired to keep the tank 90 at a temperature of from about 25 to about 45 degrees Centigrade, and preferably from about 30 to about 40 degrees Centigrade.

Controller 76 is also connected to mixer 98, which allows one to produce substantially homogeneous mixtures of the powdered material dispensed from sequencer 84 and liquid.

As desired, the required amounts of biologically active material are dispensed via line 100 through injection valve 102, which prevents the entry into line 100 of the fluid being treated. Similarly, a strainer 104 prevents large solid particles from entering line 101.

Referring again to FIG. 7, the biologically active material dispensed through injection valve 102 is released above the impeller of agitator 108. The agitator is adapted to provide a fluid flow of at least about 60 feet per minute when measured by probe 80. As is known to those skilled in the art, the "gentle flow" referred to in U.S. Pat. No. 5,228,998 is generally understood never to exceed about 0.5 feet per minute. Thus, the flow rate used in the process of this invention is at least about 120 times as great as the flow rate used in the process of such patent.

Applicant has discovered that, notwithstanding the teaching of U.S. Pat. No. 5,228,998 that the use of a flow rate in excess of 0.5 feet per minute will lead to disastrous consequences, the use of such "excessive" flow rate in fact unexpectedly vastly improves the operation of the system, making it substantially more effective, more economical, and less likely to become disabled.

One may use any suitable agitator 108. Thus, by way of illustration and not limitation, one may use an "AIRE-$O_2$ HORIZONTAL ASPIRATOR AERATOR" sold by Aeration Industries International, Inc. of Minneapolis, Minn. Referring to catalog 1-3-AIR-999-1-0395-5, one may use, e.g., a 7.5 horsepower model to provide the desired flow rate of at least 60 feet per minute. As will be apparent to those skilled in the art, the power required for the unit will vary with the length of device 10. When device 10 is about 32 feet, a 7.5 horsepower unit will be sufficient. When device 10 is 24 feet, a 5.0 horsepower unit will suffice. As will be apparent to those skilled in the art, device 10 can be made in many different configurations and generally will have a length of from about 16 to about 32 feet.

In another embodiment, agitator 108 may be an "AIRE-$O_2$ MIXER" with a rating of from 2.0 to 7.5 horsepower, which also is manufactured by the Aeration Industries International, Inc.

In another embodiment, agitator 108 is similar to the agitator disclosed in U.S. Pat. No. 5,707,562, the entire disclosure of which is hereby incorporated by reference into this specification. The apparatus of this patent is comprised of a power unit having a rotatable shaft, an impeller coupled to the shaft having a blade with a generally uniform outside daimeter, and a diffuser head positioned proximate the impeller, wherein the diffuser head includes a curved region and a stepped region, and the stepped region includes a first step and a second step.

In yet another embodiment, the agitator 108 is similar to the agitator disclosed in U.S. Pat. No. 5,078,923, the entire disclosure of which is hereby incorporated by reference into this specification. The apparatus of this patent is comprised of (a) an outer tubular housing having an inner rotary driven member disposed therein, one end of said housing being associated with aspiration means for inducing fluid flow through the aerator, the other end of said housing being associated with driving means for driving said rotary driven member and said aspiration means, (b) heating means disposed substantially around the outer surface of said heating means for causing heat generated by said heating means to substantially flow inward through said outer tubular housing, (c) insulation means disposed substantially around the outer surface of said heating means for causing heat generated by said heating means to substantially flow inward through said outer tubular housing, and (d) control means for controlling said driving means and said heating means in response to a signal denoting the presence or absence of icing conditions.

Referring again to FIGS. 1 and 2, it will be seen that each device 10 is preferably comprised of flag 120 and/or flag 122 which may be used to identify the user of the device. Furthermore, in the preferred embodiments depicted in FIGS. 1 and 2, it will also be seen that a strobe light 124 will provide measured visual signals which correspond to the flow measured by probe 80 and provide visual indications of how well and fast the system is operating. In one embodiment, if the fluid flow stops, a yellow warning light appears on strobe light 124. Strobe light 124 is preferably operatively connected to controller 76 (see FIG. 7).

Referring again to FIG. 1, it will be seen that biobreeder 10 contains a multiplicity of bio-suspension elements. One may use, e.g., the "resin bio-suspension elements 28" disclosed in U.S. Pat. No. 5,228,998, the entire disclosure of which is hereby incorporated by reference into this specification. Alternatively, one may use the 3.5 inch diameter hollow spherical shaped packing balls made of injected molded plastic and sold as "JAEGER TRI-PACS" by Jaeger Products, Inc. of Houston, Tex. Alternatively, or additionally, one may use the bio-suspension elements described in U.S. Pat. Nos. 5,634,962, 5,695,642, 5,620,602, 4,992,181, and the like. The entire disclosure of each of these United States patents is hereby incorporated by reference into this specification.

As is disclosed, e.g., in U.S. Pat. No. 5,228,998, these bio-suspension elements provide hospitable surfaces for the growth of microorganisms. In the process and apparatus of this invention, at least five distinct microorganisms are disposed on the bio-suspension elements.

Some suitable microorganisms are described in U.S. Pat. No. 4,925,564 of John Francis, the entire disclosure of which is hereby incorporated by reference into this specification. This patent describes a method for the primary biological reduction of organic manner supported in a flowing aqueous medium, comprising the steps of: (a) choosing a passive median location in the flow system having minimal flow as a result of being a high volume collection area in the flow system, and having wall surface area in contact with the aqueous medium, (b) constructing a bacterial incubator means providing a multiple increase in effective solid surface area in contact with the aqueous medium over the wall surface area, the size of the incubator being insufficient to affect the passive nature of the location, positioning the bacterial incubator means in the aqueous medium to float at the interface of the organic matter and the aqueous medium, and (d) adding to the aqueous medium a charge of bacteria cultures having a high capacity for specific organic reduction.

Bacterial cultures which are suitable for specific organic reduction may be obtained from the Solmar Corporation of 2598 Fortune Way, Suite E, Vista, Calif. 92083. Thus, by way of illustration and not limitation, suitable bacterial cultures available from such Corporation include HC-507 (hydrocarbon specific), HF-508 (animal, fish, and vegetable oils specific), AW-509 (reduces crusts, cakes, and scum from the surfaces of lagoons, pits, and tanks), MD-510 (controls grease and malodor in sewage collection systems), ND-511 (anaerobic waste specific), GI-512(paper and refinery wastestreams), SP-513 (industrial waste having substantial protein content, blood, and fat), NI-514 (anaerobic waste), CL-515(trichloroethylene waste streams), CS-516 (high carbohydrate and starch waste), CM-518 (compost accelerator), SC-519(complex waste streams containing cellulose), CB-521 (breaks down clay), and the like.

Applicant has discovered that, in his process, at least five distinct bacterial cultures preferably are present at all times. Applicant has discovered that, unexpectedly, the presence of at least five such distinct cultures substantially increases the efficiency of his apparatus, and its capacity.

In one embodiment, from about 5 to about 12 distinct bacterial cultures preferably are present in the system.

Referring to FIG. 7, and to the dispenser 84 depicted therein, the material in containers 85 preferably contains a dry mixture of at least five of such distinct bacterial cultures which, in response to controller 76, are periodically dispensed into the system.

Figure 8:
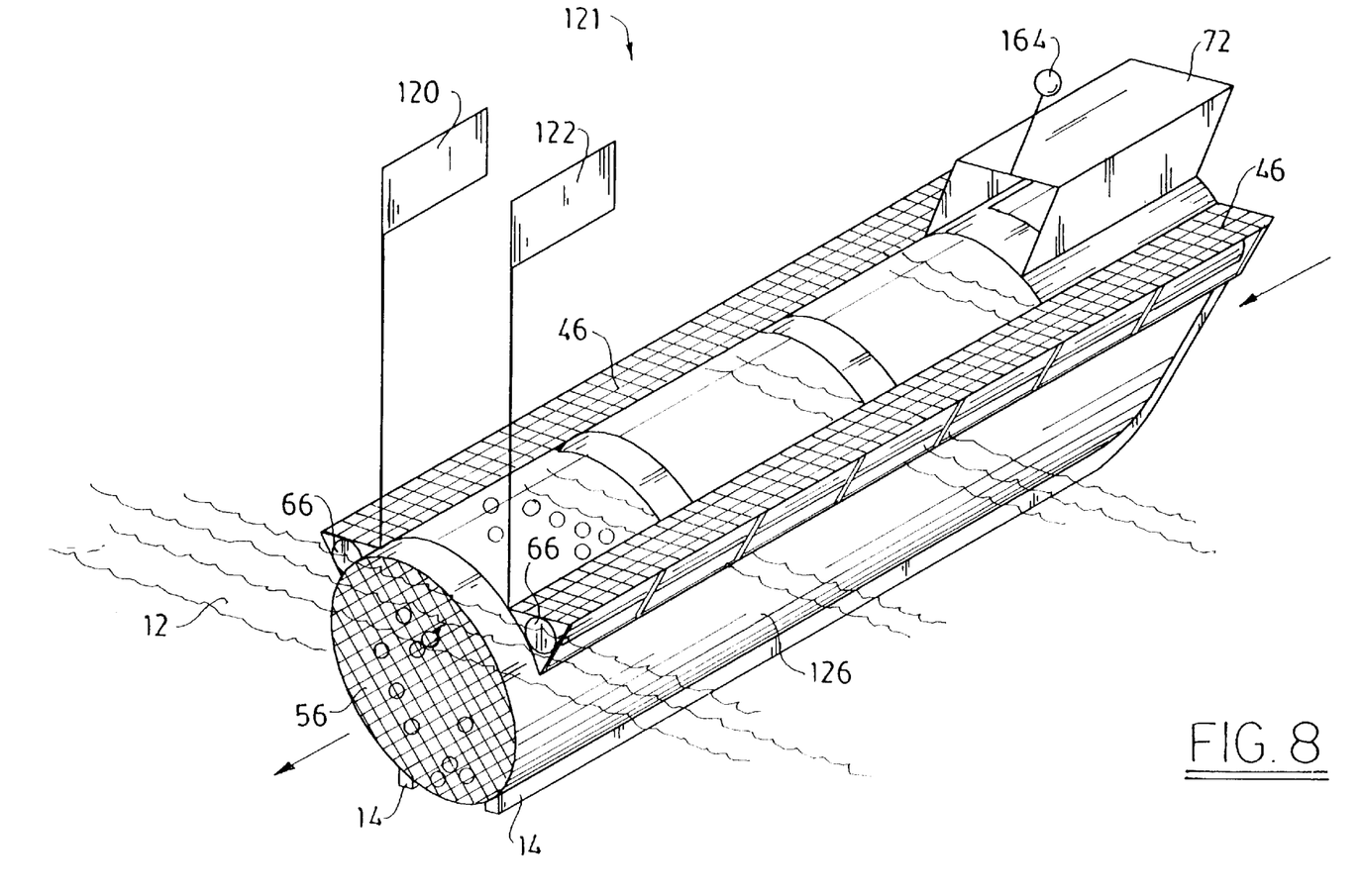
FIG. 8 is a perspective of another preferred apparatus of the invention.

FIG. 8 is a perspective view of another biobreeder 121 which is similar to the biobreeders 10 depicted in FIGS. 1 and 2 but differs therefrom by using a pipe 126 as the housing for the unit. The pipe 126 preferably has a diameter of from about 36 to about 64 inches, and a length of from about 16 to about 32 feet. The pipe is preferably made from a plastic material such as, e.g., the CSR PolyPipe described elsewhere in this specification.

In one embodiment, not shown, a multiplicity of such biobreeders 121 are disposed adjacent to each in a body of water. In this embodiment, each such biobreeder 121 contains its own control agitation device 108, but a common controller 76 may be used to control more than one of such units.

Figure 9:
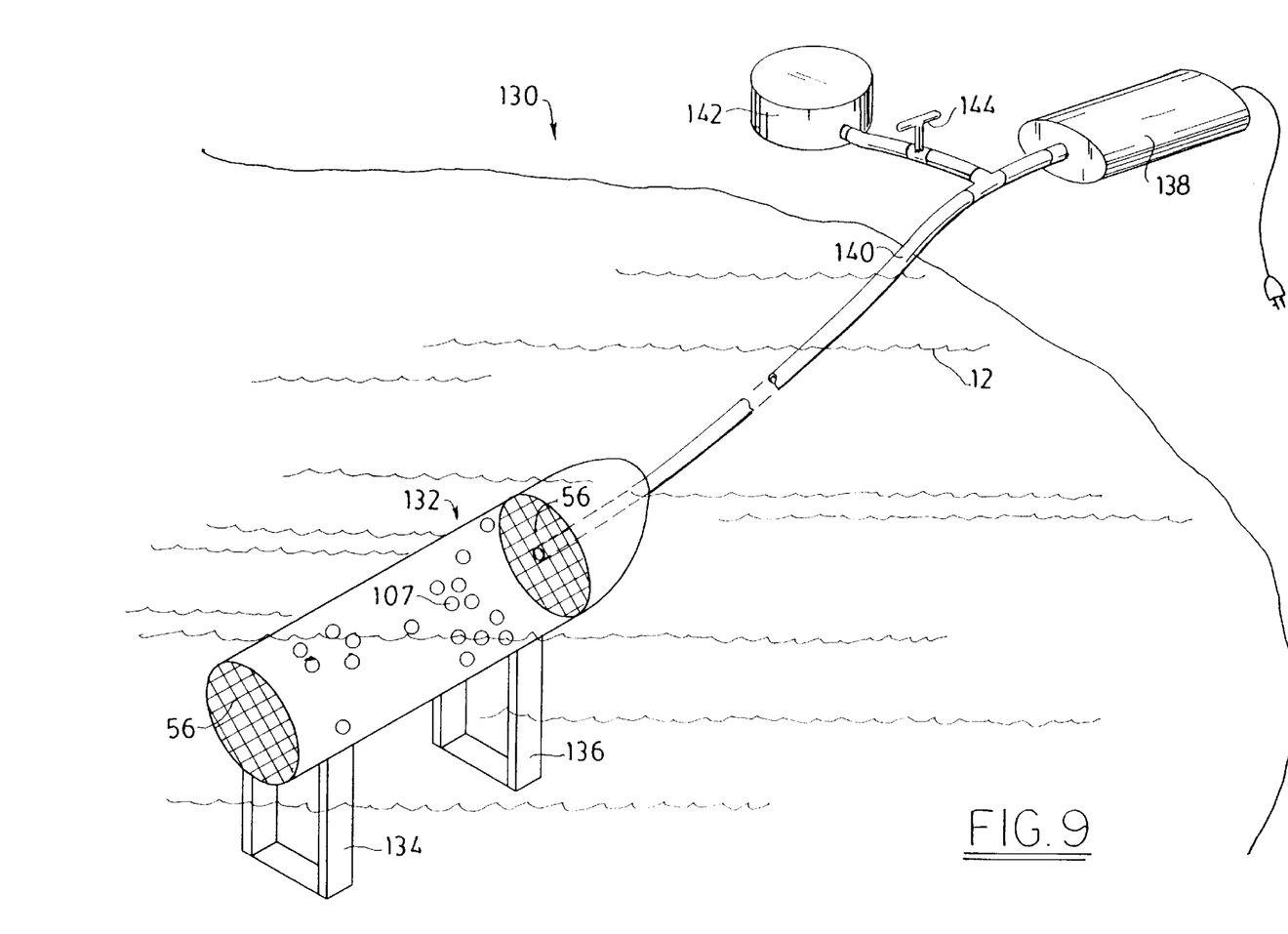
FIG. 9 is a schematic of another preferred apparatus of the invention.

FIG. 9 is a perspective view of another biobreeder 130 which, preferably, is totally submerged in a body of water

12. Referring to FIG. 12, it will be seen that the biobreeder capsule 132 is preferably supported by legs 134 and 136 which rest on the bottom of the pond 12. A compressor 138 connected to a source of electrical power (not shown) feeds compressed air to the unit via line 140. The biologically active solution used is mixed in mixer 142 and dispensed via valve 144 to line 140.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. A method for removing selected biodegradable materials from a body of water, comprising:

(a) disposing a plurality of bio-suspension elements within an enclosure which is floating at least partially submerged in a body of water, wherein said bio-suspension elements provide surfaces for supporting the growth of at least five different biological microorganisms, (b) intermittently introducing said at least five different biological microorganisms into said enclosure along with said water, wherein said water is continuously agitated, aerated and fed into said enclosure at a rate of at least about 60 feet per minute, whereby treated water is produced, (c) continuously removing said treated water from said enclosure at a rate of at least about 60 feet per minute, and (d) continuously measuring the pH, the total dissolved solids, the temperature, and the flow rate of said treated water which is removed from said enclosure at a rate of at least about 60 feet per minute.

2. The process of claim 1, wherein said body of water is a treatment lagoon.

3. The process as recited in claim 2, wherein treatment lagoon is at least 8 feet deep.

4. The process as recited in claim 1, further comprising the step of mixing biologically active material with fluid to produce a mixture and maintaining said mixture at a temperature of from about 25 to about 45 degrees Centigrade.

5. The process as recited in claim 1, further comprising the step of mixing said at least five different biological microorganisms with fluid.

6. The process as recited in claim 1, wherein said bio-suspension elements are spherical balls.

7. The process as recited in claim 6, wherein said spherical balls are hollow.

8. The process as recited in claim 7, wherein said spherical hollow balls consist essentially of injected molded plastic.

9. The process as recited in claim 8, wherein said spherical hollow balls have a diameter of about 3.5 inches.

* * * * *